Aug. 3, 1926. 1,594,997
G. W. BULLEY
MANUFACTURE OF SOUND-AMPLIFYING HORNS
Filed Feb. 8, 1926

Inventor:
George W. Bulley,
by Spear, Middleton, Donaldson, Hall
Attys.

Patented Aug. 3, 1926.

1,594,997

UNITED STATES PATENT OFFICE.

GEORGE W. BULLEY, OF AKRON, OHIO, ASSIGNOR TO THE MILLER RUBBER COMPANY, OF AKRON, OHIO, A CORPORATION OF OHIO.

MANUFACTURE OF SOUND-AMPLIFYING HORNS.

Application filed February 8, 1926. Serial No. 86,869.

My present invention relates to improvements in sound amplifying horns such as are used for radio loud speakers and kindred purposes, and concerns particularly horns which are made of hard vulcanized rubber, though not limited in all its aspects to this particular material.

In the manufacture of such horns it has been customary to form a hollow biscuit of unvulcanized sheet rubber of approximately the shape of the desired horn and place this in a mold having an internal cavity of the desired shape, and subject it to a vulcanizing heat while at the same time expanded by fluid pressure supplied by the volatilization of a blowing agent inserted within the biscuit, the pressure of the fluid from the blowing agent forcing the material against the walls of the mold, where it becomes vulcanized to the consistency of hard rubber.

In order to confine the gas in such an article during manufacture, it is necessary to provide a blow-over at each end thereof, or in other words, a closed end which must be removed after the molding of the article.

It is also necessary that the neck of the horn shall be provided with means for connection to the loud speaking device. The commercial types of loud speaking devices differ materially in size, which requires that the standard types and sizes of horn shall be manufactured each with large variations in the neck connections, which neck connections must be firmly attached to the horns so that no air leaks take place at the point of connection to the loud speaking device.

The present invention aims to provide a method and means whereby a metal ferrule may be rigidly attached to the neck of the horn during the manufacture in such a manner as to support the blow-over and retain the fluid pressure, and in which such blow-over may be readily bored out to secure the necessary air passage.

The invention aims further to provide a method and means whereby a horn of the standard type or size may be produced with means whereby it may be readily adapted for connection with any one of the various sizes of standard loud speakers, thereby greatly reducing the amount of stock necessary to be produced and carried on hand.

With these and other objects in view, the invention includes the novel method and article hereinafter described, and particularly defined in the appended claims.

In order that my invention may be better understood, reference is made to the accompanying drawing, in which:—

Figure 1:
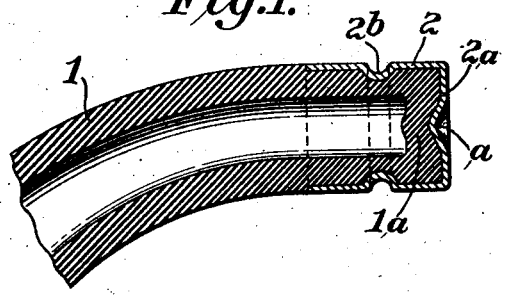

Figure 1 is a sectional view through a horn member as it appears upon the completion of the vulcanization.

Figure 2:
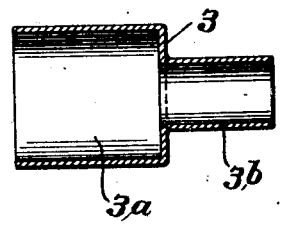
Figure 2A:
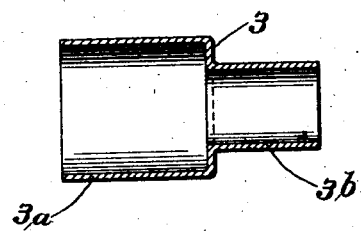
Figure 3:
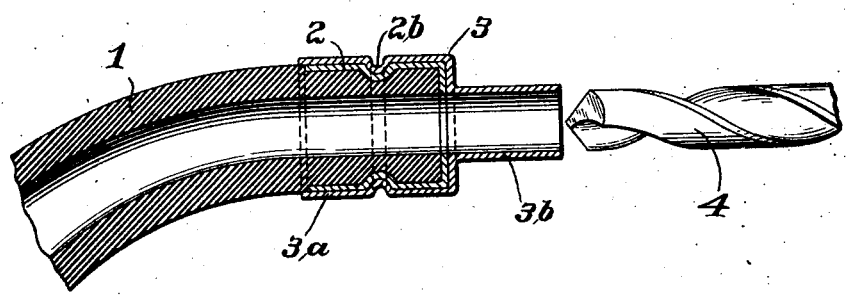

Figs. 2 and 2ª are sectional views illustrating supplemental and interchangeable nipples for application thereto, and Fig. 3 is a sectional view illustrating the boring out of the blow-over.

It may be stated at this point that horns of a large size are customarily made in two sections for convenience in manufacture, due to complication in shape, these sections being known respectively as the goose-neck and the bell, but for small horns the goose-neck, or a part equivalent thereto, would suffice, and for convenience of illustration I have shown in the present drawing only the goose-neck part, which in the present drawing is numbered 1. While the biscuit is in its plastic and unvulcanized condition, a metal ferrule 2 is applied to the small end thereof, which metal ferrule has a closed end 2ª and is provided with an inwardly swaged portion or portions for interlocking with the rubber neck for rigidly holding the ferrule in place, which interlock is preferably formed in the shape of an inwardly swaged portion 2ᵇ which forms an internal annular rib and corresponding external annular groove. The closed end wall 2ª cooperates in supporting the blow-over forming material, which is indicated at 1ª.

Preferably the closed end is provided with a central indentation $a$ which serves to accurately center the boring bit hereinafter referred to. The vulcanization of the horn in the manner described converts the rubber into hard rubber and causes the ferrule to be rigidly secured in the position shown in Fig. 1. For cooperating with this ferrule 2 I provide a plurality of ferrules 3 which have cylindrical parts 3ª the interior diameter of which accurately fits the external diameter of the ferrule 2, and which are provided with tubular extensions 3ᵇ of sizes corresponding to the various sizes or types of commercial loud speakers. Given an order or demand for horns for attachment to a loud speaker of a certain type, it is only necessary to pick from stock the requisite number of horns 1 and to assemble on these the ferrules 3 of the proper size. Such ferrule 3 having been slipped onto the ferrule 2, the sheet metal of the wall 3ª which lies over the channel 2ᵇ is spun down into the same either by hand or suitable apparatus, as shown in Fig. 3, interlocking the two firmly together. Thereafter the closed end 2ª and blow-over 1ª are bored out by a suitable drill 4, the extension 3ᵇ serving as a guide for the drill.

Having thus described my invention, what I claim is:—

1. The hereindescribed method of making amplifying horns which consists in forming a hollow biscuit of unvulcanized hard rubber with a contracted end, placing a nipple on said contracted end, and subsequently vulcanizing the biscuit in a suitable mold while subjected to internal fluid pressure.

2. The hereindescribed method of making amplifying horns, which consists in forming a hollow biscuit of unvulcanized hard rubber having a contracted end, placing on said end a nipple having an inwardly extending projection on its inner surface, and subsequently vulcanizing the biscuit in a suitable mold while subjected to internal fluid pressure.

3. The hereindescribed method of making amplifying horns which consists in forming a hollow biscuit of unvulcanized hard rubber compound with a contracted end, placing about said end a nipple having a closed end, vulcanizing the biscuit in a suitable mold while subjected to internal fluid pressure, and finally boring through the end of the nipple and the underlying layer of hard rubber.

4. The hereindescribed method of making amplifying horns which consists in forming a hollow biscuit of unvulcanized hard rubber compound with a contracted end, placing about said end a nipple having a closed end, vulcanizing the biscuit in a suitable mold while subjected to internal fluid pressure, securing to said first named nipple a second nipple having a tubular extension, and boring through the closed end of the first nipple and the underlying layer of hard rubber.

In testimony whereof, I affix my signature.

GEORGE W. BULLEY.